United States Patent Office 3,316,384
Patented Apr. 25, 1967

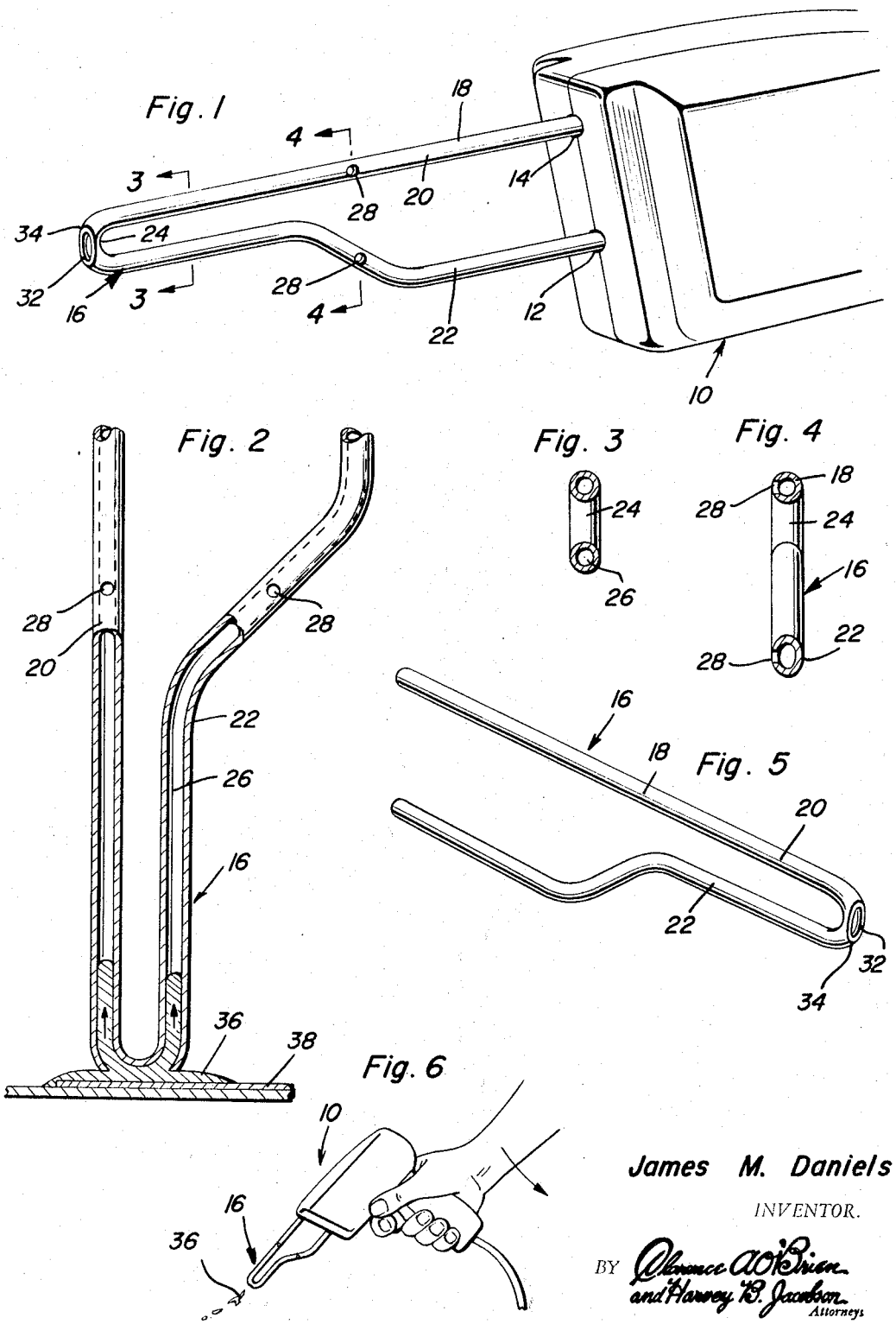

3,316,384
SOLDERING IRON TIP WITH VENTED SOLDER
CAPILLARY PASSAGE MEANS
James M. Daniels, 917 E. Crawford St., P.O. Box 392,
Donalsonville, Ga. 31745
Filed Nov. 19, 1964, Ser. No. 412,537
8 Claims. (Cl. 219—233)

This invention relates to a novel and useful soldering iron tip and more specifically to a soldering iron tip of the type including an elongated electrical conductor with opposite end portions adapted to be electrically connected to a suitable source of electrical potential.

Soldering iron tips of this type are, of course, utilized extensively on soldering guns wherein the tips are bent into a generally U-shaped configuration defining a pair of angulated leg sections joined by means of an integral curved bight portion.

The soldering iron tip of the instant invention has a capillary passage formed longitudinally through the elongated conductor which extends through the aforementioned bight portion and the adjacent portions of the angulated leg sections. The side of the bight portion remote from the free ends of the leg sections is provided with an opening which communicates with the capillary passage. When the tip of the instant invention is being utilized, after it has been heated it is placed with the opening formed in the bight portion thereof facing downwardly on the solder which is to be removed. As soon as the solder has been melted, it will move, by capillary action, through the opening and up those portions of the capillary passage disposed on opposite sides of the opening. Accordingly, it may be seen that the solder may be readily removed. In addition, after the soldering iron has been moved away from the workpiece the solder disposed in the capillary passage may be readily removed with a sharp downward movement of the hand of the user holding the soldering iron gun to which the soldering iron tip of the instant invention is secured. By abruptly stopping this downward movement and by other similar quick movements the solder within the capillary passage may be forced therefrom.

The main object of this invention is to provide a novel soldering iron tip specifically designed for removing solder.

A further object of this invention is to provide a soldering iron tip in accordance with the preceding object which will be readily adaptable to comprise a replacement for substantially all types of soldering iron gun tips.

Yet another object of this invention is to provide a soldering iron tip constructed in a manner whereby the solder removed thereby may be carried in small diameter capillary passages in the soldering iron tip and from which the solder may be readily removed with a quick and simple movement of the associated soldering iron to shake the solder from the capillary passage of the soldering iron tip.

A final object of this invention is to be specifically enumerated herein is to provide a soldering iron tip in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a pistol-type soldering iron shown with the soldering iron tip of the instant invention operatively associated therewith;

FIGURE 2 is a fragmentary side elevational view of the soldering iron tip of the instant invention shown in use removing solder from a workpiece;

FIGURE 3 is an enlarged transverse vertical sectional view taken substantially upon the plane indicated by the section line 3—3 of FIGURE 1;

FIGURE 4 is an enlarged transverse vertical sectional view taken substantially upon the plane indicated by the section line 4—4 of FIGURE 1;

FIGURE 5 is a perspective view of the soldering iron tip; and

FIGURE 6 is a diagrammatical view showing the associated soldering iron being supported and moved in a manner to remove the solder from the soldering iron tip.

Referring now more specifically to the drawings the numeral 10 generally designates a typical form of gun-type soldering iron. The gun-type soldering iron includes two openings 12 and 14 through which the free ends of a generally U-shaped soldering iron tip may be inserted for electrical connection with a suitable source of electrical potential.

The soldering iron gun 10 includes an improved form of tip which is generally referred to by the reference numeral 16 and which is designed specifically to remove solder from a workpiece. The soldering iron tip is defined by an elongated conductor 18 which is bent into a generally U-shaped configuration including a pair of generally parallel leg sections 20 and 22 interconnected by means of integral and curved bight portions 24. As can best be seen from FIGURE 2 of the drawings the elongated conductor has a small diameter capillary passage 26 formed therethrough. Each of the legs 22 and 20 is provided with a small diameter vent opening 28 which opens into the corresponding portion of the capillary passage and the forwardmost end if the tip 16 defined by the bight portion 24 has an opening 32 formed therein which is also communicated with the capillary passage 26.

The opening 32 is formed in the tip 16 in a manner such that the mass of the bight portion 24 in the area thereof in which the opening 32 is formed has been reduced to the extent that this area has a reduced capacity to conduct electricity thereby rendering this area a resistance-type heating zone of the tip 16 which, because of its substantially reduced mass, will become heated as current flows through the elongated conductor 18. In addition, it may be seen that the surfaces of the bight portion 24 defining the opening 32 and designated by the reference numeral 34 are substantially planar and extend about the openings 32. These planar surfaces 34 will of course greatly facilitate the transfer of heat from the soldering iron tip 16 to the solder which is to be removed.

From FIGURE 2 of the drawings it may be seen that when current is passed through the conductor 18 sufficient heat is generated in the bight portion 24 thereof to cause the mass 36 of solder on the workpiece 38 to be melted. The melted solder then passes through the opening 32 in the bight portion 24 and upwardly through the adjacent portions of the capillary passage 26 until all of the mass 36 has been removed. Then, with the soldering gun 10 still actuated to cause current to flow through the conductor 18, the soldering gun may be shaken sharply as pictured in FIGURE 6 of the drawings whereupon the melted mass 36 will be caused to be forced out of the opening 32.

While it is conceivable that a relatively thick layer or coating of solder may form on the inside surfaces of the conductor 18 defining the passage 26 and thereby render the passage too small in diameter to receive a relatively large mass of solder, inasmuch as the opening 32 is oval in shape so as to provide direct access to the portions of the passage 26 formed in the leg sections 20 and 22, a suitable elongated and flexible scrubbing element may be inserted into each portion of the passage 26 after the elongated conductor has been heated in the usual manner to again restore the tip 16 to its original effectiveness.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A soldering iron tip of the type including an elongated conductor including opposite end portions adapted to be electrically connected to a source of electrical potential and a pair of adjacent relatively angulated sections joined by means of an integral bight portion, said bight portion and at least the adjacent portions of said sections having a capillary passage formed longitudinally therethrough, said bight portion having an opening formed therein communicated with said passage and through which solder in a fluid state is adapted to pass by capillary action, at least one of said angulated sections including means venting the portion of said passage formed therein to the ambient atmosphere.

2. The combination of claim 1 wherein said opening reduces the mass of said bight portion in the area thereof in which said opening is formed to the extent that said area has a reduced capacity to conduct electricity thereby rendering said area a resistance-type heating zone.

3. The combination of claim 1 wherein said bight portion and said adjacent sections of said conductor define a portion thereof which is generally U-shaped in configuration, said opening opening in a direction away from the direction in which said sections extend away from said bight portion.

4. The combination of claim 1 wherein said bight portion and said adjacent sections of said conductor define a portion thereof which is generally U-shaped in configuration, said opening opening in a direction away from the direction in which said sections extend away from said bight portion, the portion of the exterior dsposed adjacent and about said opening defining a planar surface.

5. A soldering iron tip of the type including an elongated conductor including opposite end portions adapted to be electrically connected to a source of electrical potential and a pair of adjacent relatively angulated sections joined by means of an integral bight portion, said bight portion and at least the adjacent portions of said sections having a capillary passage formed longitudinally therethrough, said bight portion having an opening formed therein communicated with said passage and through which solder in a fluid state is adapted to pass by capillary action, both of said angulated sections including means venting the portions of said passage formed therein to the ambient atmosphere.

6. The combination of claim 5 wherein said means venting said portions of said passages comprises transverse bores formed in said angulated sections and communicated with said passages.

7. A soldering iron tip of the type including an elongated conductor including opposite end portions adapted to be electrically connected to a source of electrical potential and a pair of adjacent relatively angulated sections joined by means of an integral bight portion, said bight portion and at least the adjacent portions of said sections having a capillary passage formed longitudinally therethrough, said bight portion having an opening formed therein communicated with said passage and through which solder in a fluid state is adapted to pass by capillary action, said bight portion and said adjacent sections of said conductor defining a portion thereof which is generally U-shaped in configuration, said opening opening in a direction away from the direction in which said sections extend away from said bight portion, wherein both of said angulated sections including means venting the portions of said passage formed therein to the ambient atmosphere.

8. The combination of claim 7 wherein said means venting said portions of said passages comprises transverse bores formed in said angulated sections and communicated with said passage.

References Cited by the Examiner

UNITED STATES PATENTS

| | | | |
|---|---|---|---|
| 2,462,131 | 2/1949 | Rustin | 228—53 |
| 3,003,049 | 10/1961 | Thomas | 219—230 X |
| 3,050,612 | 8/1962 | Eversole | 219—233 |
| 3,084,649 | 4/1963 | Parstorfer | 228—52 X |
| 3,234,357 | 2/1966 | Seuthe | 219—300 X |
| 3,239,124 | 3/1966 | Hathcock | 228—20 |

ANTHONY BARTIS, *Primary Examiner.*